United States Patent [19]

Fukao et al.

[11] Patent Number: 5,066,626
[45] Date of Patent: Nov. 19, 1991

[54] CERAMIC MATERIALS FOR USE IN INSERT-CASTING AND PROCESSES FOR PRODUCING THE SAME

[75] Inventors: Kaname Fukao, Inuyama; Toshiyuki Hamanaka, Suzuka; Takashi Harada; Noboru Kondo, both of Nagoya, all of Japan

[73] Assignee: NGK Insulators, Ltd., Tokyo, Japan

[21] Appl. No.: 445,486

[22] Filed: Dec. 4, 1989

[30] Foreign Application Priority Data

Dec. 2, 1988 [JP] Japan .................. 63-304002
Feb. 17, 1989 [JP] Japan .................... 1-38900

[51] Int. Cl.$^5$ .................. C04B 35/10; C04B 35/46; C04B 35/50
[52] U.S. Cl. ..................... 501/128; 501/80; 501/134; 501/152
[58] Field of Search ............... 501/128, 127, 152, 80, 501/134; 502/439

[56] References Cited

U.S. PATENT DOCUMENTS

| | | | |
|---|---|---|---|
| 4,118,240 | 10/1978 | Takabatake | 501/152 |
| 4,194,917 | 3/1980 | Sakemi et al. | 501/152 |
| 4,327,188 | 4/1982 | Endo et al. | |
| 4,483,944 | 11/1984 | Day et al. | 501/128 |
| 4,746,638 | 5/1988 | Hori et al. | 501/127 |
| 4,767,731 | 8/1988 | Asami et al. | 501/128 |
| 4,855,265 | 8/1989 | Day et al. | 501/128 |

FOREIGN PATENT DOCUMENTS

| | | | |
|---|---|---|---|
| 0133021 | 2/1985 | European Pat. Off. | |
| 0285312 | 10/1988 | European Pat. Off. | 501/128 |
| 2402630 | 4/1979 | France | |
| 56-92164 | 7/1981 | Japan | 501/128 |
| 63-236759 | 10/1988 | Japan | 501/128 |

OTHER PUBLICATIONS

Chemical Abstract-"Ceramic Material for Use as a Port Liner to be Insert Cast-Has Aluminum Titanate as Major Crystalline Phase", J63-236,759 (10/3/88) (Japan Patent Pub.).
Chemical Abstract-"Aluminum Titanate Honeycomb Ceramic-for Treating Automobile Exhaust Gases" J56-89844 (7/21/81) (Japan Patent Public.).
Chemical Abstracts-"Aluminum Titanate Honeycomb, Useful as Catalyst Carrier-Comprising Aluminum Titanate, at least 1 of Lantharum, Cerium, and Yttrium Oxide and Opt. Ferric Oxide", Japanese Patent Public. 56-92,164-(7/25/81).
Japanese Patent Abstract-56-89844 "Ceramic Honeycomb and Its Production" 7/21/81 (same as Chem. Abstract 2).

*Primary Examiner*—William R. Dixon, Jr.
*Assistant Examiner*—Paul Marcantoni
*Attorney, Agent, or Firm*—Parkhurst, Wendel & Rossi

[57] ABSTRACT

A ceramic material for use in insert-casting, which contains not less than 65% by volume of aluminum titanate as a crystalline phase. The average particle diameter of crystals of the aluminum titanate is not less than 10 μm, and not more than 20% by volume of a glass phase containing a rare earth element in an amount of 0.5 to 16% by weight when calculated in the form of an oxide is contained. Young's modulus is 50 to 2,000 kgf/mm$^2$. A process for producing the same is also disclosed, which includes the steps of preparing a powder by mixing a material, as an Al$_2$O$_3$ source material, containing not more than 96% by weight of Al$_2$O$_3$ and having an average particle size of not less than 3 μm, a material having an average particle diameter of not more than 3 μm as a TiO$_2$ source material, and a given rare earth element in an amount of 1.8% by weight when calculated in the form of an oxide, shaping the powder, and drying and firing the shaped body. The ceramic material has an actual break strain of not less than $6 \times 10^{-3}$. The process for producing such a ceramic material includes a step of cooling the shaped body at a rate of at least not less than 500° C./hr in a temperature range not less than 200° C. during and/or after the firing.

15 Claims, 10 Drawing Sheets

FIG_1
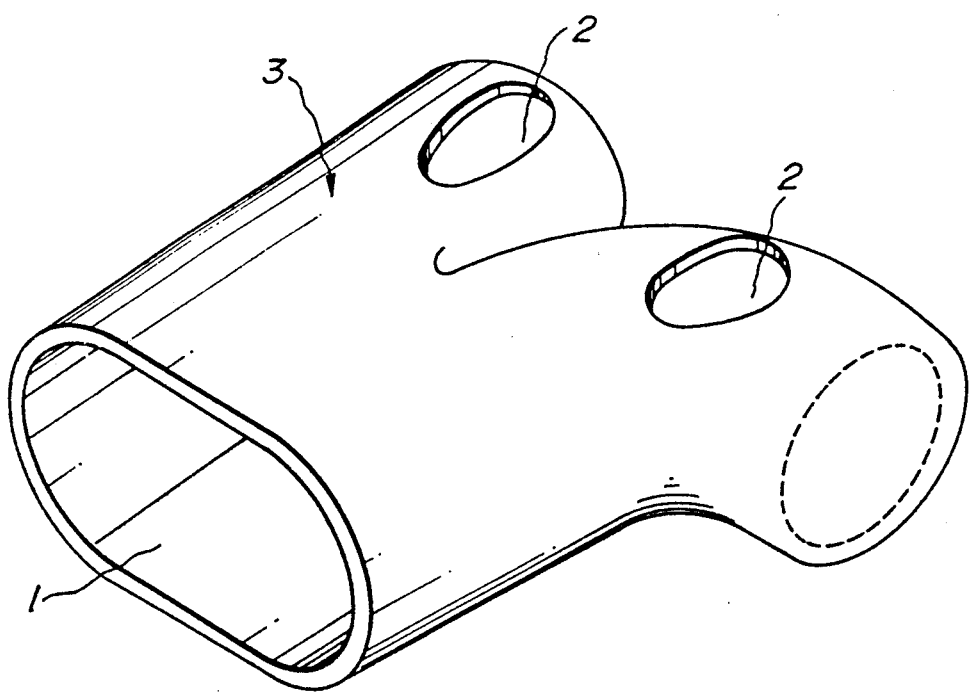

FIG._2
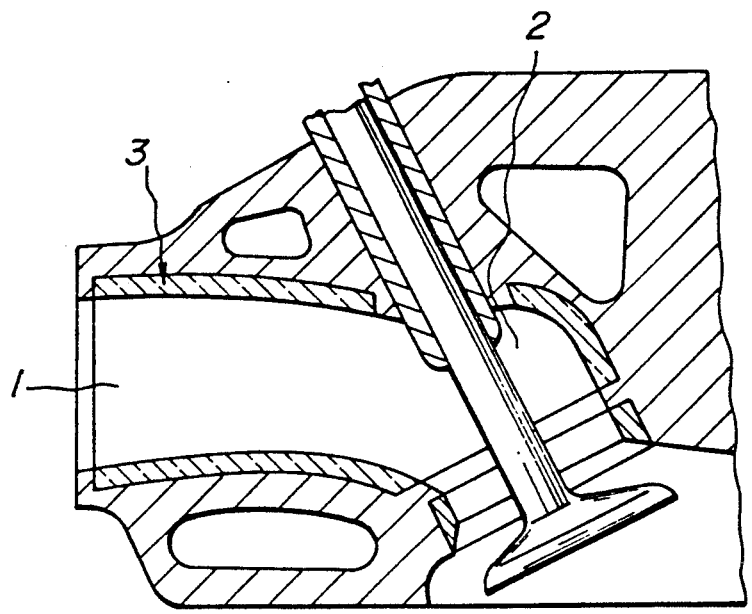
FIG._3
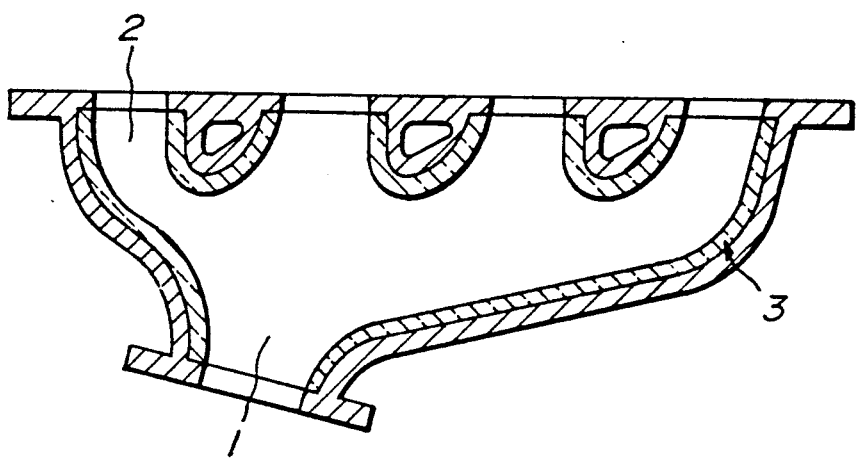

FIG_5a
FIG_5b
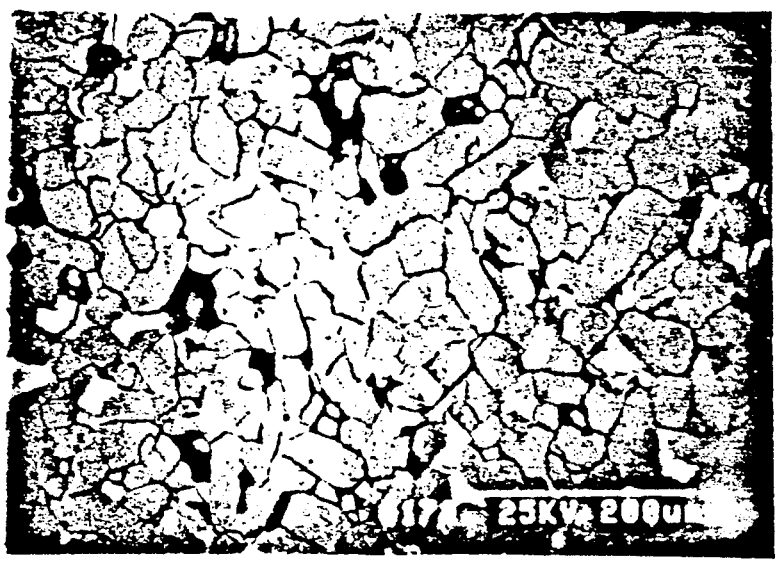

FIG_6a
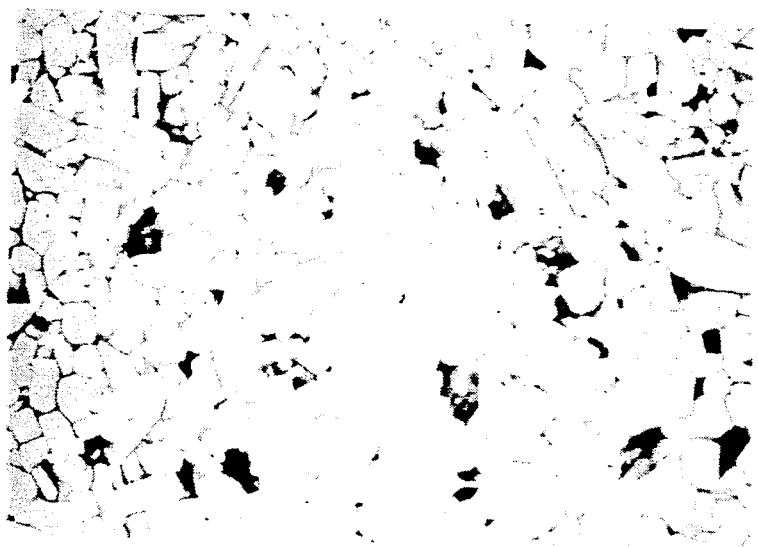
FIG_6b
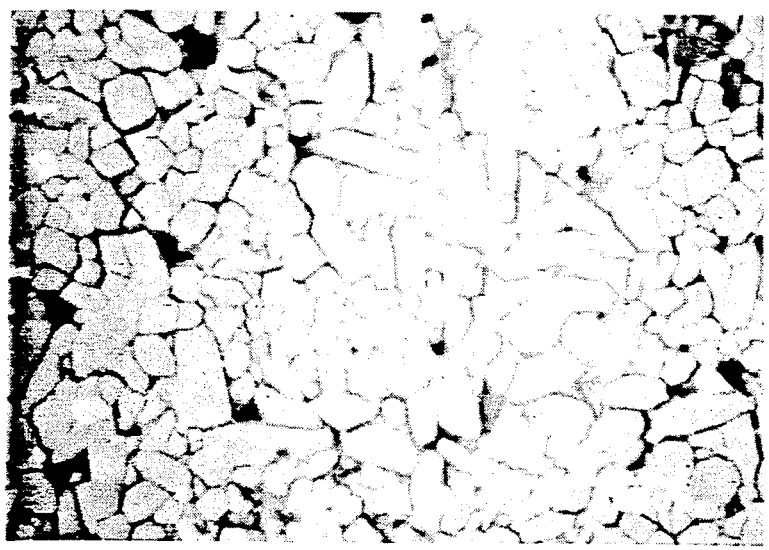

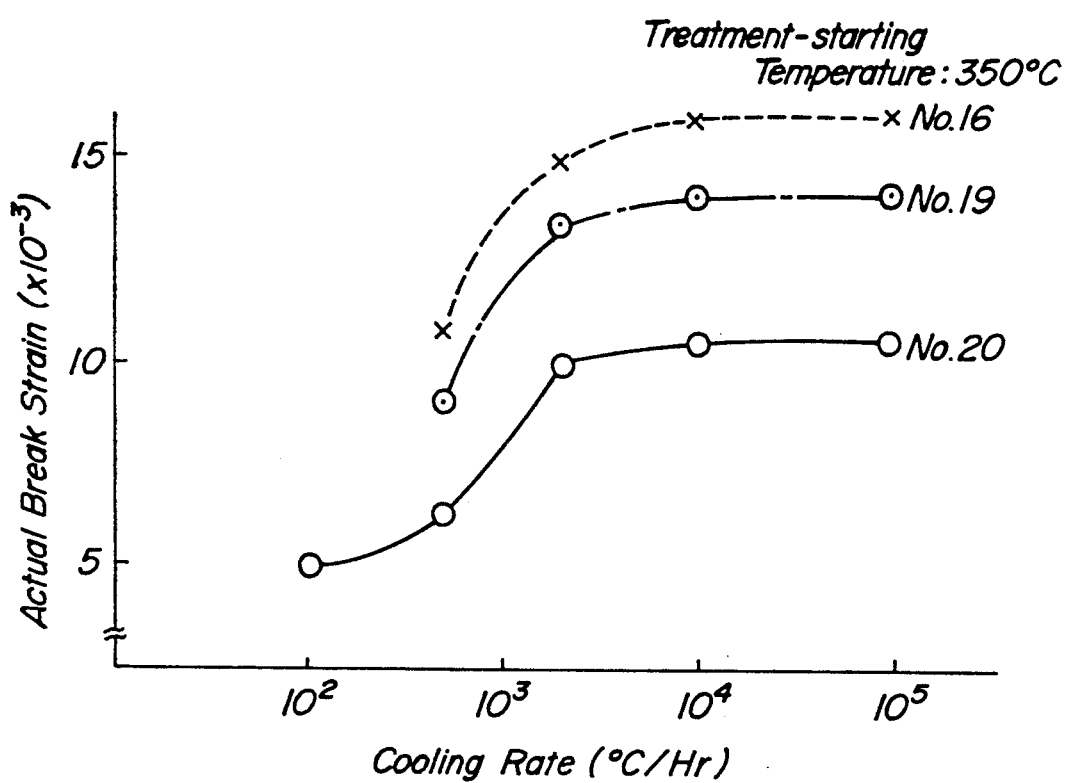
FIG_9b

FIG_10a
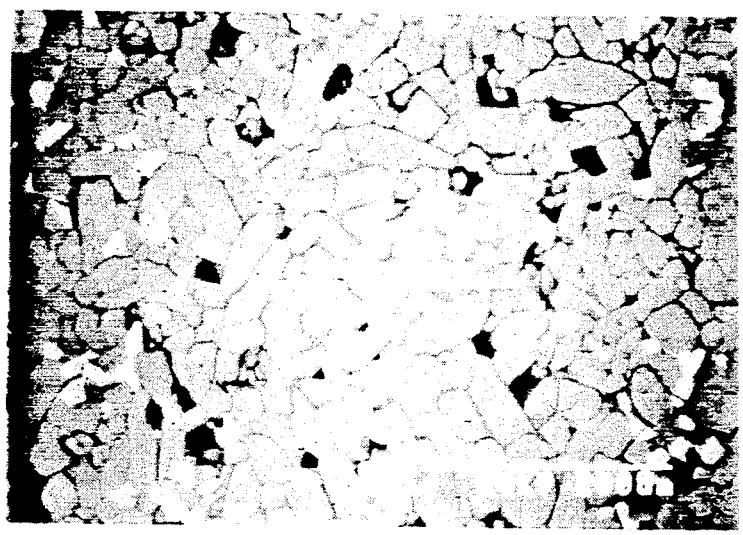
FIG_10b

CERAMIC MATERIALS FOR USE IN INSERT-CASTING AND PROCESSES FOR PRODUCING THE SAME

BACKGROUND OF THE INVENTION

1. Field of the Invention

The present invention relates to ceramic materials for use in enclosing a hollow tubular ceramic material by insert-casting with a melt of a metal such as aluminum or cast iron. Particularly, the invention relates to heat-insulating ceramic materials for use in insert-casting as port liners, exhaust manifold liners, piston cavities, cylinder top plates, etc. in gasoline engines, diesel engines and the like. The invention also relates to processes for producing such ceramic materials.

2. Related Art Statement

Recently, environmental pollution caused by with automobile exhaust gases has become a serious social problem, and methods for removing poisonous materials from the automobile exhaust gases with use of catalysts are mainly employed. Reduction in use amounts of noble metals such as Pt, Rh, etc. used as catalysts therefor results in a problem from the stand point of natural resources and costs. Further, four valve engines, which have recently increasingly been employed, pose a problem in that a catalytic purification performance is reduced by reduction in temperatures of exhaust gases.

As one method for solving the above problems, Japanese Patent Application Laid-open No. 63-236,759 proposes that the inner surface of an exhaust port or an exhaust port liner is lined with a port liner made of a ceramic material having a low Young's modulus so that the temperature of exhaust gases may be increased by its heat insulating property. Further, Japanese Patent Publication No. 57-3,629 and Japanese Patent Application Laid-open No. 56-92,164 disclose the addition of a rare earth element to aluminum titanate as also intended in the present invention.

However, there are problems that the materials disclosed in Japanese Patent Application Laid-open No. 63-236,759 suffer deterioration in strength due to a cooling-heating cycle owing to changes in temperatures of the exhaust gases when in use, and that the materials are broken.

In the inventions of both Japanese Patent Publication No. 57-3,629 and Japanese Patent Application Laid-open No. 56-92,164, dense sintered bodies having a low thermal expansion are obtained by adding a given amount of an oxide of Y, La and/or Ce to aluminum titanate. However, Young's modulus of all these sintered bodies are high, and they cannot be used for materials in insert-casting.

As the ceramic materials used for increasing the temperature by their heat insulating property, those having lower Young's modulus are preferred, because they can mitigate great compression stresses occurring through shrinkage of a molten metal during insert-casting of liners. NGK Insulators, Ltd. have formerly developed ceramic materials for use in insert-casting, in which not less than 65% by volume of aluminum titanate is contained as a crystalline phase, and proposed them in Japanese Patent Application Laid-open No. 63-236,759.

However, succeeding researches revealed that although the above materials had the Young's modulus E falling in the range from 50 to 2,000 kgf/mm$^2$, some of them were broken upon insert-casting, while others were not. Therefore, stable insert-castability cannot be assured, which poses a practical problem.

The present invention is to solve the conventional problems mentioned above, and has been accomplished to provide practical ceramic materials suitable for insert-casting, which have excellent heat resistance, thermal shock resistance and heat insulation, are free from the occurrence of cracks owing to compression forces generated on insert-casting, and have durability in cooling-heating cycles during use. The invention also provides processes for producing such ceramic materials.

SUMMARY OF THE INVENTION

The ceramic materials for use in insert-casting according to a first aspect of the present invention are characterized in that 65% by volume of aluminum titanate is contained as a crystalline phase, not less than the average particle diameter of crystals is not less than 10 μm, that an amount of a glass phase containing a rare earth element in an amount of 0.5 to 16% by weight calculated as an oxide is not more than 20% by volume, and that a Young's modulus is 50 to 2,000 kgf/mm$^2$.

Further, the process for producing the ceramic materials for use in insert casting according to the present invention comprises the steps of: preparing a powder having a given composition consisting essentially of a starting material containing not more than 96% by weight of $Al_2O_3$ and having an average particle diameter of not more than 3 μm as an $Al_2O_3$ source material, a starting material having an average particle diameter of 3 μm as a $TiO_2$ source material, and a rare earth element in an amount of not more than 1.8% by weight when calculated in the form of an oxide; shaping the powder; and drying and firing the shaped body.

A second aspect of the present invention has been accomplished based on the following recognition:

The present inventors have repeated studies to accomplish the object of the present invention, and discovered that although the conventional Young's modulus is determined based on a correlation formula between the strain and the stress in the elastic region of the material, with respect to a ceramic material for use in insert-casting as in the present invention, a deflected amount of the materials, which results in actual breakage of the material, has an important meaning in the judgment as to whether cracks will occur or not, and that physical properties of the material should be evaluated based on a below-mentioned actual rupture strain calculated based on the deflected amount.

The ceramic materials according to the second aspect of the present invention are characterized in that not less than 65% by volume of aluminum titanate is contained as a crystalline phase, that the average particle diameter of the crystals of aluminum titanate is not less than 10 μm, and that the actual rupture strain is not less than $6 \times 10^{-3}$.

The actual rupture strain used herein means a nondimensional quantity defined by the following equation:

Actual rupture strain = four point bending strength/Young's modulus at break

Although Young's modulus is generally a ratio of stress/strain in an elastic region of the material, "Young's modulus at break" used herein means an imaginary Young's modulus obtained by the deflective amount of the material until the material is broken during the measurement of the four point bending strength.

A third aspect of the present invention, which is an improvement of the second aspect of the present invention, is characterized in that not less than 65% by volume of aluminum titanate is contained as a crystalline phase, that an average particle diameter of the crystals of aluminum titanate is not less than 10 μm, that a glass phase containing a rare earth element in an amount of 0.5 to 16% by weight when calculated in the form of an oxide is not more than 17% by volume, and that the actual rupture strain is not less than $6 \times 10^{-3}$.

The process for producing the ceramic materials for use in insert-casting according to the second aspect of the present invention comprises the steps of: preparing a powder having a given composition consisting essentially of a starting material containing not more than 96% by weight of $Al_2O_3$ and having an average particle diameter of not less than 3 μm as an $Al_2O_3$ source material, and a material having an average particle diameter of not more than 3 μm as a $TiO_2$ source material: shaping a powder: firing the shaped body: and cooling the body at a speed of not less than 500° C./hr from a temperature not less than 200° C. during the firing and/or after the firing.

The process for producing the ceramic materials for use in insert-casting according to the third aspect of the present invention comprises the steps of: preparing a powder having a given composition consisting essentially of a starting material containing not more than 96% by weight of $Al_2O_3$ and having an average particle diameter of not less than 3 μm as an $Al_2O_3$ source material, a starting material having an average particle diameter of not more than 3 μm as a $TiO_2$ source material, and a rare earth element in an amount of not more than 1.8% by weight when calculated in the form of an oxide: shaping the powder, drying and firing the shaped body, and cooling the body at a speed of not less than 500° C./hr from a temperature not less than 200° C. during the firing and/or after the firing.

Since coefficients of thermal expansion of a- and b-axes of the aluminum titanate crystal are positive, while that of a c-axis is negative. Further, differences among them are great. Thus, strain occurs in the grain boundaries owing to changes in temperatures such as cooling-heating cycles. In conventional materials constituted by fine crystals, such a strain does not cause into a great problem. On the other hand, particularly in the case of Young's modulus-reduced ceramic materials for use in insert-casting, in which crystals of aluminum titanate are grown up to not less than 10 μm on the average, it was found out that the above strain becomes so large that the gap between the grains widens to lower strength.

To the contrary, the present inventors have found that when a very small amount of at least one rare earth element such as Y, Ce or La is added, reduction in strength by the cooling-heating cycles can be prevented. This is considered that the added rare earth element collects at the intergranular glass phase to increase strength of the glass phase and bonding forces between the glass phase and the aluminum titanate crystals.

That is, the present invention has been accomplished on the basis of the above-mentioned ceramic materials having the structure which has aluminum titanate having a given average crystalline particle diameter as a main crystalline phase and in which the glass phase containing a given amount of the rare earth element is present in the grain boundaries of the aluminum titanate crystals can attain low Young's modulus aimed at by the present invention and durability in cooling-heating cycles.

As a method for producing the ceramic material having the above crystalline structure, the ceramic material for use in insert-casting can be obtained, by using a coarse $Al_2O_3$ source material having a low purity, a fine $TiO_2$ source material, and a given amount of a rare earth element, in which not less than 65% by volume of aluminum titanate is contained as a favorable crystalline phase of the above material, the average particle diameter of the crystals is not less than 10 μm, Young's modulus is 50 to 2,000 kgf/mm², compression strength is 5 to 40 kgf/mm², and porosity is 5 to 35%.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a perspective view of a port liner for use in a four valve engine;

FIG. 2 is a sectional view of a port liner inserted in an engine head by casting;

FIG. 3 is a sectional view of an exhaust manifold liner after insert-casting;

FIGS. 5a and 5b are SEM photographs showing the structures of crystals in a fired body according to the present invention before and after the cooling-heating cycle, respectively;

FIGS. 6A and 6B are SEM photographs showing the structures of a fired body in Comparative Examples before and after the cooling-heating cycle, respectively;

Figure 9A:
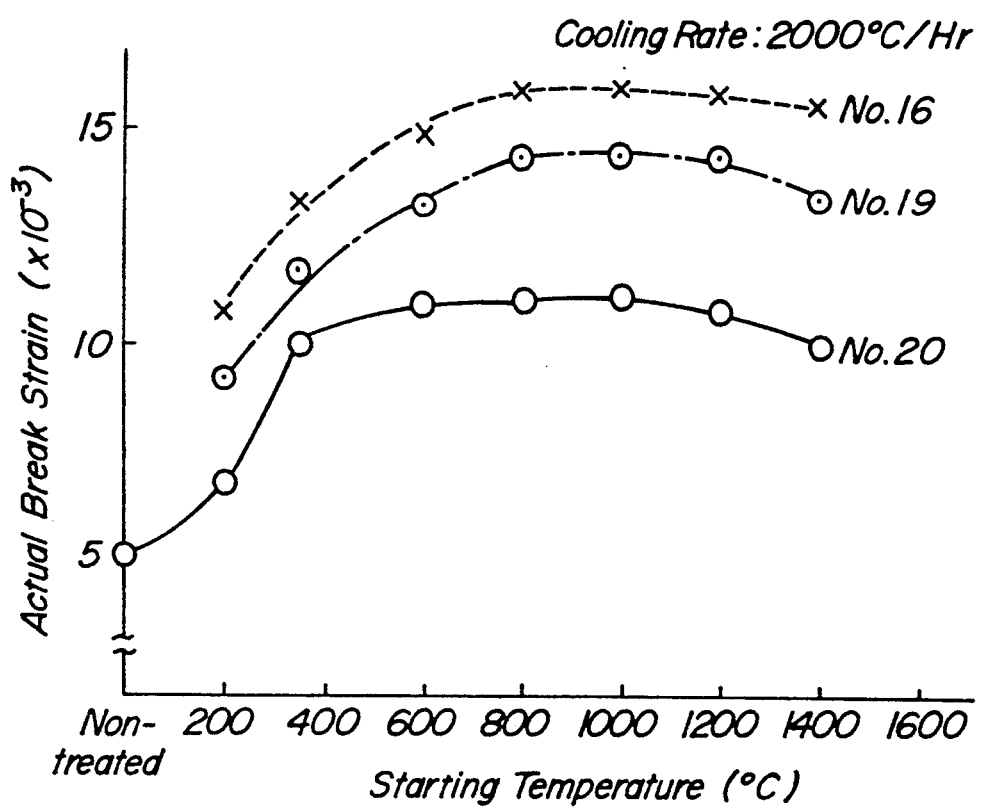

FIGS. 9a and 9b are a graph showing changes in actual rupture strain when a rapidly cooling-starting temperature was changed in the rapidly cooling treating conditions, and a graph showing changes in actual rupture strain when a cooling rate was varied in the rapidly cooling conditions, respectively; and FIGS. 10a and 10b are an SEM photograph of the structure of crystals in a fired body rapidly cooled after firing, and an SEM photograph showing the structure of crystals in a fired body as a comparative example, respectively.

DETAILED DESCRIPTION OF THE INVENTION

Reasons for the limitations in the ceramic materials according to the present invention and their preferable ranges are as follows:

The reasons why the amount of aluminum titanate and the average particle diameter of the crystals of the aluminum titanate are limited to not less than 65% by volume and not less than 10 μm, respectively, are that the amount or the average particle diameter are less than 65% by volume or less than 10 μm, respectively, Young's modulus exceeds 2,000 kgf/mm² so that cracks occur on insert-casting.

Further, if the amount of the glass phase is more than 20% by volume, Young's modulus exceeds 2,000 kgf/mm². Thus, the amount of the glass phase is limited to not more than 20%.

In addition, if the amount of the rare earth element in the glass phase is less than 0.5% by weight when calculated in the form of the oxide, the reduction rate in the four point bending strength in the cooling-heating cycle is more than 10%. If the rare earth element exceeds 16% by weight, Young's modulus becomes more than 2,000 kgf/mm². Thus, the content of the rare earth element in the glass phase is limited to 0.5 to 16% by weight when calculated in the form of the oxide.

Reason for the preferable ranges in the present invention are as follows:

If the compression strength is less than 5 kgf/mm² and/or if the four point bending strength is less than 0.2 kgf/mm², the ceramic material may be deformed on insert-casting, so that handling problems rise. If the compression strength is more than 40 kgf/mm² or if the four point bending strength is more than 2.0 kgf/mm², Young's modulus may exceed 2,000 kgf/mm². Further, if the porosity is less than 5%, a sufficient heat insulating effect cannot be obtained. If the porosity is more than 35%, Young's modulus may fall outside the numerical range in the present invention. It is most preferable that the Young's modulus is set particularly at 50 to 200 kgf/mm². If the rare earth element in the glass phase exceeds 10% by weight when calculated in the form of the oxide, Young's modulus becomes greater than 200 kgf/mm². In addition, it is preferable that the composition of the ceramic material consists essentially of 40 to 65% by weight of $Al_2O_3$ and 30 to 60% by weight of $TiO_2$. The reason for this is that if the composition falls outside the above composition, the crystal amount of the aluminum titanate is difficult to exceed 65% by volume. The reason why at least one kind of $SiO_2$, MgO and $Fe_2O_3$ is preferably in a total amount of not more than 10% is that if it exceeds 10% by weight, the crystal amount of the aluminum titanate is also difficult to exceed not less than 65% by volume, and the crystalline particle diameter may not be 10 μm or more. Furthermore, when the ceramic material according to the present invention possesses the coefficient of thermal expansion of not more than $2.0 \times 10^{-6}$ (40° to 800° C.) and a heat conductivity of $0.8 \times 10^{-3}$ to $5.0 \times 10^{-3}$ cal/cm·sec.° C., the material is suitable for port liners to be brought into direct contact with exhaust gases at high temperatures.

Next, reasons for the limitations in the $Al_2O_3$ source material and the $TiO_2$ source material in the producing process according to the first aspect of the present invention are as follows:

If the $Al_2O_3$ source material has the purity of more than 96% and the average particle diameter of more than 3 μm, the amount of the unreacted portion increases due to low reactivity of the $Al_2O_3$ source material so that Young's modulus becomes higher than 2,000 kgf/mm² because of insufficient growth of microcracks and that cracking of the ceramic material is feared on insert-casting with aluminum. Furthermore, if the average particle diameter of the $Al_2O_3$ source material is less than 3 μm, the average particle diameter of aluminum titanate is reduced to less than 10 μm irrespective of the purity of the $Al_2O_3$, so that Young's modulus becomes higher than 2,000 kgf/mm². Moreover, if the content of impurities contained in the $Al_2O_3$ source material is more than 20% by weight of $SiO_2$, more than 20% by weight of $Fe_2O_3$, or more than 20% by weight of $SiO_2 + Fe_2O_3$ in total, it may be that the amount of the aluminum titanate is less than 65% by volume and that the average crystal particle diameter is not less than 10 μm. From the above, the $Al_2O_3$ source material must have the purity of not more than 96% by weight and the average particle diameter of not less than 3 μm. The amount of the impurities is preferably 0 to 20% by weight of $SiO_2$, 0 to 20% by weight of $Fe_2O_3$, or 0 to 20% by weight of $SiO_2 + Fe_2O_3$ in total.

If the average particle diameter of the $TiO_2$ source material is more than 3 μm, the amount of the unreacted portion increases, so that Young's modulus exceeds 2,000 kgf/mm². Thus, it is feared that the material will crack during insert-casting with aluminum. Therefore, the $TiO_2$ source material has the average particle diameter of not more than 3 μm.

When the rare earth element such as Y, La or Ce is added in an amount of not more than 1.8% by weight, Young's modulus can be controlled to not more than 2,000 kgf/mm². If it is added in an amount less than 0.3% by weight, Young's modulus can be controlled to not more than 200 kgf/mm².

In order to produce the ceramic materials according to the first aspect of the present invention, materials are selected from alumina, calcined bauxite, purified rutile, crude rutile, anatase type titanium, ilmenite, ferrite red iron oxide, electrofused magnesium, magnesite, electrofused spinel, kaoline, quartz, electrofused silica, specific rare earth elements, etc. to give a chemical composition consisting essentially of 40 to 65% by weight of $Al_2O_3$, 30 to 60% by weight of $TiO_2$, and not more than 10% by weight of at least one kind of $SiO_2$, MgO and $Fe_2O_3$ in total.

At that time, it is necessary that a starting material containing less than 96% purity by weight of $Al_2O_3$ and the average particle diameter of not less than 3 μm as the $Al_2O_3$ source material is mixed with a material having the average particle diameter of not more than 3 μm as the $TiO_2$ source material.

Further, the rare earth element may be added in the form of a nitrate, an oxide or any other compound. In order to obtain an intended effect with a very small addition amount of the rare earth element, it is preferable to uniformly disperse fine particles of the material thereof.

0.1 to 1.0% by weight of a deflocculant selected from water glass, ammonium polycarbonates, amines, sodium pyrophosphates, or the like is added to the mixture, to which 1.0 to 5.0% by weight of a binder selected from PVA, MC, CMC, acrylates or the like is added. The resulting mixture is sufficiently mixed and stirred by means of a trommel, a pot mill or the like together with 15 to 40% by weight of water to prepare a slurry having a viscosity of 200 to 1,000 cp. The slurry is shaped in a cylindrical form or in the form of a port liner by casting, which is dried and fired. As a result, the aluminum titanate sintered body can be obtained, which has excellent heat resistance, thermal shock resistance, heat insulation and durability in cooling-heating cycles and which contains not less than 65% by weight of aluminum titanate as a crystalline phase and not more than 20% by weight of the glass phase involving 0.5 to 16% by weight of the rare earth element when calculated in the form of the oxide. One or more kinds of rutile, corundum and mullite may be contained as other crystalline phases. According to the present invention, the crystals of aluminum titanate are sufficiently grown to not less than 10 μm by setting the firing conditions to, for instance, 1,450° to 1,650° C., preferably 1,500° to 1,600° C., for 1 to 16 hours. By so doing, the ceramic material can acquire physical properties of Young's modulus of 50 to 2,000 kgf/mm$^2$, preferably compression strength of 5 to 40 kgf/mm$^2$, four point bending strength of 0.2 to 2.0 kgf/mm$^2$, and porosity of 5 to 35%. Since the ceramic materials having such a low Young's modulus can shrink together with a metallic material when the cast metallic material shrinks, no cracks occur due to concentration of stress particularly in the case of such a complicated shape as to break a conventional, high strength, high Young's modulus ceramic due to concentration of stresses.

Therefore, the ceramic materials according to the present invention can favorably be applied to, as a matter of course, conventional cylindrical port liners as well as a port liner 3 having a complicated shape shown in FIG. 1 or 2 and a port liner for an exhaust manifold as shown in FIG. 3. In these figures, two ports 2 are provided on a cylinder side of a four valve engine, and a single exhaust opening 1 is provided in an exhaust manifold side. Heat conductivity is lowered by the cracks in the sintered body, so that a sufficient heat insulating effect can be obtained even when the porosity is relatively small.

Since aluminum titanate has a melting point of not less than 1,700° C., no particular limitation is posed upon metals to be cast. Gray cast iron, nodular graphite cast iron, white cast iron, aluminum alloy, copper alloy, magnesium alloy, and zinc alloy may be used for insert casting.

Further, the intergranular glass phase is firmly bonded to aluminum titanate by making a very small amount of a rare earth element present in the glass phase, so that the ceramic material having durability in the cooling-heating cycle can be obtained without deteriorating low Young's modulus favorable for insert-casting.

Next, Examples of the first aspect of the present invention will be explained below.

EXPERIMENT 1

By using an Al$_2$O$_3$ source material shown in Table 1 and a TiO$_2$ source material shown in Table 2 as main components, a raw material was formulated to give each of compositions in Test Run Nos. 1-35 shown in Table 3, and cast into a mold, thereby preparing elliptical section test pieces having a thickness of 3 mm, a main axis of 64 mm and a minor axis of 36 mm. Each test piece was fired under conditions given in Table 3, and various physical properties were measured with respect to thus obtained fired bodies.

Next, after molding sand is charged into each fired body, it was enclosed with aluminum by casting to prepare a metal-ceramic composite body having an aluminum thickness of 7 mm. After the molding sand was removed, it was checked whether cracks occurred in the test piece or not. Results are shown in Table 3.

Figure 4:
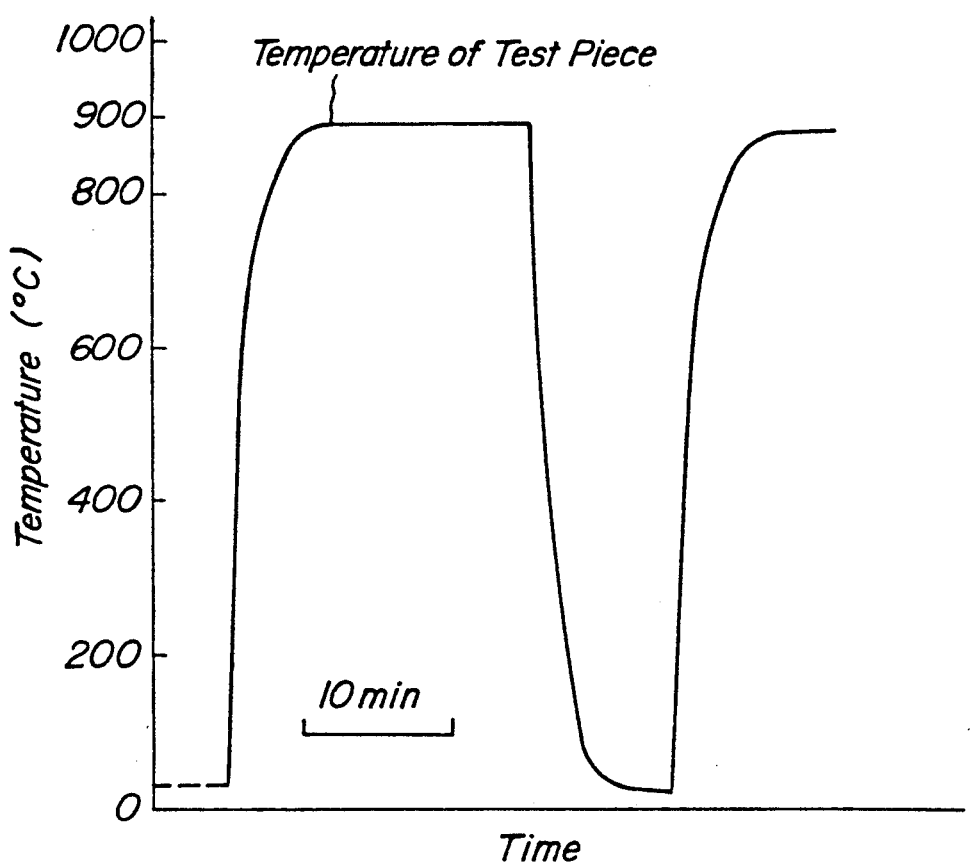
FIG. 4 is a graph illustrating a cooling-heating cycle for evaluation in the present invention.
Figure 7:
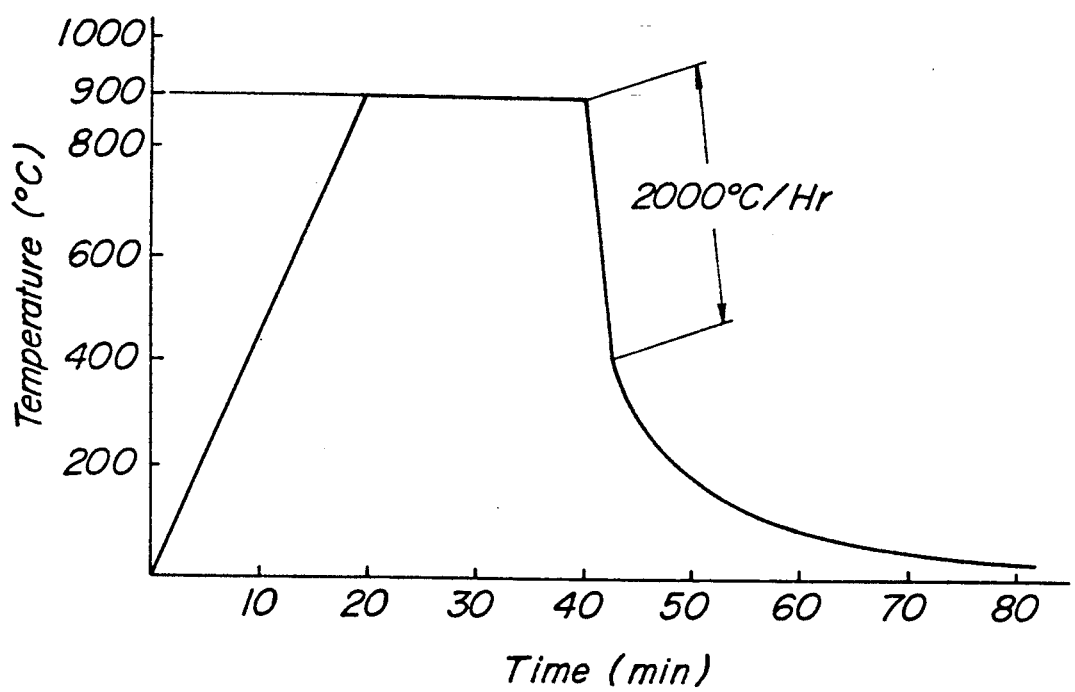
FIG. 7 is a graph showing an example of schedules of rapidly cooling conditions.

In a cooling-heating cycle test of Table 1, the test piece was repeatedly subjected to a cooling-heating cycle of keeping it at room temperature for 10 minutes and 900° C. for 20 minutes at 50 times as shown in FIG. 4. FIG. 4 gives a schedule and the temperature of the cooling-heating cycle. A reduction rate of the four point bending strength of the test piece between before and after the cooling-heating cycle test was measured. Amounts of aluminum titanate and a glass phase were determined as % by volume based on their area-occupying rates in an SEM photograph. Further, an amount of a rare earth element in the glass phase was measured by an EDX analysis by means of a transmission electron microscope.

In order to facilitate observation of changes in the cooling-heating cycle with respect to the materials according to the present invention and as Comparative Examples, FIGS. 5a, 5b, 6a and 6b are microphotographs of sintered body, and sintered body having undergone the above cooling-heating by 600 times. That is, FIGS. 5a and 5b show the crystalline structures of the fired body according to the present invention before and after the cooling-heating cycles, respectively. FIGS. 6a and 6b show the crystalline structures of the fired body of Comparative Example before and after the cooling-heating cycle, respectively. From FIGS. 5a, 5b, 6a and 6b, it is seen that the gap is widened by the cooling-heating cycle in the ceramic material of Comparative Example, but that no conspicuous difference is recognized between before and after the cooling-heating cycle in the ceramic materials according to the present invention.

TABLE 1

|  |  | A-1 | A-2 | A-3 | A-4 | A-5 |
|---|---|---|---|---|---|---|
| Chemical | SiO$_2$ | 0.9 | 2.1 | 2.7 | 2.7 | 2.4 |
| analysis | Al$_2$O$_3$ | 98.1 | 96.0 | 94.8 | 95.1 | 95.3 |
| value | Fe$_2$O$_3$ | 0.1 | 0.4 | 0.5 | 0.4 | 0.4 |
| (wt %) | TiO$_2$ | 0.6 | 1.3 | 1.8 | 1.6 | 1.7 |
|  | Others | 0.3 | 0.2 | 0.2 | 0.2 | 0.2 |
| Average particle diameter (μm) |  | 12.9 | 13.1 | 9.8 | 3.0 | 1.4 |

TABLE 2

|  |  | T-1 | T-2 | T-3 |
|---|---|---|---|---|
| Chemical | SiO$_2$ | 0.0 | 0.0 | 0.0 |
| analysis | Al$_2$O$_3$ | 0.0 | 0.0 | 0.0 |
| value | Fe$_2$O$_3$ | 0.0 | 0.0 | 0.0 |
| (wt %) | TiO$_2$ | 99.6 | 99.4 | 99.5 |
|  | Others | 0.4 | 0.6 | 0.5 |
| Average particle diameter (μm) |  | 5.8 | 3.0 | 0.7 |

TABLE 3(a)

| Run No. |  | 1 | 2 | 3 | 4 |
|---|---|---|---|---|---|
| Al$_2$O$_3$ source material |  | A-3 | A-3 | A-3 | A-3 |
| TiO$_2$ source material |  | T-3 | T-3 | T-3 | T-3 |
| Composition | Al$_2$O$_3$ | 43.3 | 43.3 | 53.8 | 53.8 |
| (wt %) | TiO$_2$ | 53.4 | 53.4 | 42.2 | 42.2 |
|  | SiO$_2$ | 3.3 | 3.3 | 3.0 | 3.0 |
|  | MgO | — | — | — | — |

TABLE 3(a)-continued

| Run No. | 1 | 2 | 3 | 4 |
|---|---|---|---|---|
| $Fe_2O_3$ | — | — | 1.0 | 1.0 |
| Oxide of rare earth element | — | 0.25 ($Y_2O_3$) | — | 0.05 ($CeO_2$) |
| Firing temperature (°C.) | 1550 | 1550 | 1550 | 1550 |
| Young's modulus (kgf/mm$^2$) | 1330 | 1410 | 120 | 120 |
| Compression strength (kgf/mm$^2$) | 23 | 23 | 11 | 10 |
| Four point bending strength (kgf/mm$^2$) | 1.1 | 1.2 | 0.4 | 0.4 |
| Porosity (%) | 5.8 | 5.9 | 8.5 | 8.7 |
| AT crystal average particle size (μm) | 16 | 17 | 20 | 20 |
| AT crystal amount (%) | 84 | 83 | 92 | 92 |
| Glass phase amount (%) | 9 | 9 | 8 | 8 |
| Amount of rare earth element oxide in glass phase (%) | — | 13.5 | — | 0.5 |
| Coefficient of thermal expansion ($\times 10^{-6}$/°C.) | −1.0 | −1.3 | −1.4 | −1.5 |
| Heat conductivity ($\times 10^{-3}$ cal/cm · s · °C.) | — | 1.7 | 1.4 | — |
| Crystal phase other than AT | rutile | rutile | — | — |
| Occurrence of cracks | not cracked | not cracked | not cracked | not cracked |
| Reduction rate in four point bending strength in cooling-heating cycle (%) | 19 | −1 | 23 | 9 |
| Remarks | Comparative Example | Example | Comparative Example | Example |

TABLE 3(b)

| Run No. | | 5 | 6 | 7 | 8 |
|---|---|---|---|---|---|
| $Al_2O_3$ source material | | A-3 | A-3 | A-3 | A-3 |
| $TiO_2$ source material | | T-3 | T-3 | T-3 | T-3 |
| Composition (wt %) | $Al_2O_3$ | 53.8 | 53.8 | 53.8 | 53.8 |
| | $TiO_2$ | 42.2 | 42.2 | 42.2 | 42.2 |
| | $SiO_2$ | 3.0 | 3.0 | 3.0 | 3.0 |
| | MgO | — | — | — | — |
| | $Fe_2O_3$ | 1.0 | 1.0 | 1.0 | 1.0 |
| | Oxide of rare earth element | 0.25 ($CeO_2$) | 1.0 ($CeO_2$) | 1.5 ($CeO_2$) | 2.5 ($CeO_2$) |
| Firing temperature (°C.) | | 1550 | 1550 | 1550 | 1550 |
| Young's modulus (kgf/mm$^2$) | | 130 | 340 | 1420 | 2310 |
| Compression strength (kgf/mm$^2$) | | 11 | 12 | 35 | 44 |
| Four point bending strength (kgf/mm$^2$) | | 0.4 | 0.6 | 1.4 | 2.2 |
| Porosity (%) | | 8.8 | 8.3 | 7.4 | 6.1 |
| AT crystal average particle size (μm) | | 19 | 15 | 12 | 9 |
| AT crystal amount (%) | | 92 | 91 | 91 | 90 |
| Glass phase amount (%) | | 8 | 9 | 9 | 10 |
| Amount of rare earth element oxide in glass phase (%) | | 2.8 | 10.6 | 16.0 | 25.3 |
| Coefficient of thermal expansion ($\times 10^{-6}$/°C.) | | −1.7 | −1.8 | −1.7 | −1.8 |
| Heat conductivity ($\times 10^{-3}$ cal/cm · s · °C.) | | 1.4 | — | — | — |
| Crystal phase other than AT | | — | — | — | — |
| Occurrence of cracks | | not cracked | not cracked | not cracked | cracked |
| Reduction rate in four point bending strength in cooling-heating cycle (%) | | 0 | 1 | −1 | 0 |
| Remarks | | | Example | | Comparative Example |

TABLE 3(c)

| Run No. | | 9 | 10 | 11 | 12 |
|---|---|---|---|---|---|
| $Al_2O_3$ source material | | A-3 | A-3 | A-3 | A-3 |
| $TiO_2$ source material | | T-3 | T-3 | T-3 | T-3 |
| Composition (wt %) | $Al_2O_3$ | 53.8 | 53.8 | 53.8 | 44.0 |
| | $TiO_2$ | 42.2 | 42.2 | 42.2 | 52.0 |
| | $SiO_2$ | 3.0 | 3.0 | 3.0 | 3.0 |
| | MgO | — | — | — | — |

TABLE 3(c)-continued

| Run No. | 9 | 10 | 11 | 12 |
|---|---|---|---|---|
| $Fe_2O_3$ | 1.0 | 1.0 | 1.0 | 1.0 |
| Oxide of rare earth element | 0.25 ($La_2O_3$) | 0.25 ($Y_2O_3$) | 0.25 ($Dy_2O_3$) | 0.25 ($CeO_2$) |
| Firing temperature (°C.) | 1550 | 1550 | 1550 | 1600 |
| Young's modulus (kgf/mm$^2$) | 140 | 160 | 150 | 190 |
| Compression strength (kgf/mm$^2$) | 11 | 11 | 10 | 10 |
| Four point bending strength (kgf/mm$^2$) | 0.4 | 0.5 | 0.4 | 0.5 |
| Porosity (%) | 8.8 | 8.8 | 8.9 | 5.4 |
| AT crystal average particle size (μm) | 19 | 18 | 19 | 19 |
| AT crystal amount (%) | 92 | 92 | 92 | 75 |
| Glass phase amount (%) | 8 | 8 | 8 | 8 |
| Amount of rare earth element oxide in glass phase (%) | 2.8 | 2.9 | 2.8 | 2.8 |
| Coefficient of thermal expansion ($\times 10^{-6}$/°C.) | −1.7 | −1.8 | −1.7 | −1.1 |
| Heat conductivity ($\times 10^{-3}$ cal/cm · s · °C.) | 1.3 | 1.4 | 1.4 | — |
| Crystal phase other than AT | — | — | — | rutile |
| Occurrence of cracks | not cracked | not cracked | not cracked | not cracked |
| Reduction rate in four point bending strength in cooling-heating cycle (%) | 2 | −1 | 1 | 2 |
| Remarks | Example | | | |

TABLE 3(d)

| Run No. | | 13 | 14 | 15 | 16 |
|---|---|---|---|---|---|
| $Al_2O_3$ source material | | A-3 | A-3 | A-3 | A-3 |
| $TiO_2$ source material | | T-3 | T-3 | T-3 | T-3 |
| Composition (wt %) | $Al_2O_3$ | 49.0 | 53.8 | 55.7 | 62.9 |
| | $TiO_2$ | 47.0 | 42.2 | 40.3 | 33.8 |
| | $SiO_2$ | 3.0 | 3.0 | 3.0 | 3.3 |
| | MgO | — | — | — | — |
| | $Fe_2O_3$ | 1.0 | 1.0 | 1.0 | — |
| | Oxide of rare earth element | 0.25 ($CeO_2$) | 0.25 ($CeO_2$) | 0.25 ($CeO_2$) | — |
| Firing temperature (°C.) | | 1600 | 1600 | 1600 | 1550 |
| Young's modulus (kgf/mm$^2$) | | 170 | 100 | 190 | 1890 |
| Compression strength (kgf/mm$^2$) | | 10 | 9 | 11 | 37 |
| Four point bending strength (kgf/mm$^2$) | | 0.5 | 0.4 | 0.5 | 1.7 |
| Porosity (%) | | 6.8 | 7.4 | 11.4 | 12.4 |
| AT crystal average particle size (μm) | | 23 | 23 | 24 | 12 |
| AT crystal amount (%) | | 83 | 92 | 86 | 80 |
| Glass phase amount (%) | | 9 | 8 | 8 | 8 |
| Amount of rare earth element oxide in glass phase (%) | | 2.6 | 2.5 | 2.9 | — |
| Coefficient of thermal expansion ($\times 10^{-6}$/°C.) | | −1.3 | −1.7 | −1.2 | 1.1 |
| Heat conductivity ($\times 10^{-3}$ cal/cm · s · °C.) | | 1.2 | — | — | — |
| Crystal phase other than AT | | rutile | — | mullite | corundum mullite |
| Occurrence of cracks | | not cracked | not cracked | not cracked | not cracked |
| Reduction rate in four point bending strength in cooling-heating cycle (%) | | 2 | 2 | 3 | 12 |
| Remarks | | Example | | | Comparative Example |

TABLE 3(e)

| Run No. | | 17 | 18 | 19 | 20 |
|---|---|---|---|---|---|
| $Al_2O_3$ source material | | A-3 | A-3 | A-3 | A-3 |
| $TiO_2$ source material | | T-3 | T-3 | T-3 | T-3 |
| Composition (wt %) | $Al_2O_3$ | 62.9 | 54.2 | 54.2 | 54.2 |
| | $TiO_2$ | 33.8 | 42.5 | 42.5 | 42.5 |
| | $SiO_2$ | 3.3 | 1.1 | 1.1 | 1.1 |
| | MgO | — | 1.1 | 1.1 | 1.1 |
| | $Fe_2O_3$ | — | 1.1 | 1.1 | 1.1 |

TABLE 3(e)-continued

| Run No. | 17 | 18 | 19 | 20 |
|---|---|---|---|---|
| Oxide of rare earth element | 1.25 ($Y_2O_3$) | — | 0.25 ($CeO_2$) | 0.5/0.5 ($Y_2O_3/CeO_2$) |
| Firing temperature (°C.) | 1550 | 1550 | 1550 | 1550 |
| Young's modulus (kgf/mm$^2$) | 2000 | 130 | 140 | 310 |
| Compression strength (kgf/mm$^2$) | 38 | 11 | 11 | 12 |
| Four point bending strength (kgf/mm$^2$) | 1.7 | 0.4 | 0.4 | 0.6 |
| Porosity (%) | 11.1 | 9.0 | 9.2 | 9.3 |
| AT crystal average particle size (μm) | 12 | 19 | 18 | 18 |
| AT crystal amount (%) | 79 | 93 | 93 | 93 |
| Glass phase amount (%) | 10 | 7 | 7 | 7 |
| Amount of rare earth element oxide in glass phase (%) | 12.1 | — | 2.7 | 13.9 |
| Coefficient of thermal expansion ($\times 10^{-6}$/°C.) | 0.9 | −1.5 | −1.7 | −1.8 |
| Heat conductivity ($\times 10^{-3}$ cal/cm · s · °C.) | 1.5 | 1.2 | 1.3 | 1.2 |
| Crystal phase other than AT | corundum mullite | — | — | — |
| Occurrence of cracks | not cracked | not cracked | not cracked | not cracked |
| Reduction rate in four point bending strength in cooling-heating cycle (%) | −2 | 18 | 1 | −1 |
| Remarks | Example | Comparative Example | Example | |

TABLE 3(f)

| Run No. | 21 | 22 | 23 | 24 |
|---|---|---|---|---|
| Al$_2$O$_3$ source material | A-3 | A-3 | A-3 | A-3 |
| TiO$_2$ source material | T-3 | T-3 | T-3 | T-3 |
| Composition (wt %) Al$_2$O$_3$ | 54.3 | 54.3 | 55.5 | 54.2 |
| TiO$_2$ | 42.5 | 42.5 | 43.5 | 42.5 |
| SiO$_2$ | 1.6 | 1.6 | 1.0 | 3.3 |
| MgO | 1.6 | — | — | — |
| Fe$_2$O$_3$ | — | 1.6 | — | — |
| Oxide of rare earth element | 1.0 (Yb$_2$O$_3$) | 1.0 (Nd$_2$O$_3$) | 0.28 (Y$_2$O$_3$) | 0.28 (Y$_2$O$_3$) |
| Firing temperature (°C.) | 1550 | 1550 | 1550 | 1550 |
| Young's modulus (kgf/mm$^2$) | 410 | 360 | 200 | 180 |
| Compression strength (kgf/mm$^2$) | 13 | 12 | 11 | 12 |
| Four point bending strength (kgf/mm$^2$) | 0.7 | 0.7 | 0.5 | 0.5 |
| Porosity (%) | 9.4 | 9.5 | 14.1 | 9.5 |
| AT crystal average particle size (μm) | 18 | 19 | 18 | 19 |
| AT crystal amount (%) | 91 | 91 | 97 | 92 |
| Glass phase amount (%) | 9 | 9 | 3 | 8 |
| Amount of rare earth element oxide in glass phase (%) | 10.9 | 10.5 | 10.0 | 3.0 |
| Coefficient of thermal expansion ($\times 10^{-6}$/°C.) | −1.7 | −1.6 | −1.8 | −1.7 |
| Heat conductivity ($\times 10^{-3}$ cal/cm · s · °C.) | — | — | — | — |
| Crystal phase other than AT | — | — | — | — |
| Occurrence of cracks | not cracked | not cracked | not cracked | not cracked |
| Reduction rate in four point bending strength in cooling-heating cycle (%) | −1 | 0 | −1 | −1 |
| Remarks | | Example | | |

TABLE 3(g)

| Run No. | 25 | 26 | 27 | 28 |
|---|---|---|---|---|
| Al$_2$O$_3$ source material | A-3 | A-3 | A-1 | A-2 |
| TiO$_2$ source material | T-3 | T-3 | T-3 | T-3 |
| Composition (wt %) Al$_2$O$_3$ | 51.6 | 50.4 | 54.3 | 54.3 |
| TiO$_2$ | 40.4 | 39.6 | 42.5 | 42.5 |
| SiO$_2$ | 8.0 | 10.0 | 1.6 | 1.6 |
| MgO | — | — | — | — |
| Fe$_2$O$_3$ | — | — | 1.6 | 1.6 |
| Oxide of rare | 1.8 | 2.0 | 1.0 | 1.0 |

TABLE 3(g)-continued

| Run No. | 25 | 26 | 27 | 28 |
|---|---|---|---|---|
| earth element | ($Y_2O_3$) | ($Y_2O_3$) | ($CeO_2$) | ($CeO_2$) |
| Firing temperature (°C.) | 1550 | 1550 | 1500 | 1500 |
| Young's modulus (kgf/mm$^2$) | 1110 | 2030 | 2430 | 870 |
| Compression strength (kgf/mm$^2$) | 25 | 41 | 4 | 14 |
| Four point bending strength (kgf/mm$^2$) | 1.1 | 2.1 | 0.1 | 1.0 |
| Porosity (%) | 5.4 | 4.9 | 35.1 | 11.8 |
| AT crystal average particle size (μm) | 20 | 18 | 13* | 18 |
| AT crystal amount (%) | 83 | 76 | 60 | 88 |
| Glass phase amount (%) | 17 | 24 | 7 | 9 |
| Amount of rare earth element oxide in glass phase (%) | 11.3 | 8.0 | 14.1 | 10.7 |
| Coefficient of thermal expansion ($\times 10^{-6}$/°C.) | −1.4 | −1.3 | 2.0 | −1.4 |
| Heat conductivity ($\times 10^{-3}$ cal/cm · s · °C.) | — | — | — | 1.1 |
| Crystal phase other than AT | — | — | rutile corundum | corundum |
| Occurrence of cracks | not cracked | cracked | cracked | not cracked |
| Reduction rate in four point bending strength in cooling-heating cycle (%) | 1 | 3 | — | 2 |
| Remarks | Example | Comparative | Example | Example |

TABLE 3(h)

| Run No. | 29 | 30 | 31 | 32 |
|---|---|---|---|---|
| $Al_2O_3$ source material | A-4 | A-5 | A-3 | A-3 |
| $TiO_2$ source material | T-3 | T-3 | T-1 | T-2 |
| Composition (wt %) $Al_2O_3$ | 54.3 | 54.3 | 54.3 | 54.3 |
| $TiO_2$ | 42.5 | 42.5 | 42.5 | 42.5 |
| $SiO_2$ | 1.6 | 1.6 | 1.6 | 1.6 |
| MgO | — | — | — | — |
| $Fe_2O_3$ | 1.6 | 1.6 | 1.6 | 1.6 |
| Oxide of rare earth element | 1.0 ($CeO_2$) | 1.0 ($CeO_2$) | 1.0 ($CeO_2$) | 1.0 ($CeO_2$) |
| Firing temperature (°C.) | 1500 | 1500 | 1500 | 1500 |
| Young's modulus (kgf/mm$^2$) | 1280 | 2850 | 2570 | 930 |
| Compression strength (kgf/mm$^2$) | 24 | 43 | 3 | 15 |
| Four point bending strength (kgf/mm$^2$) | 1.2 | 1.7 | 0.1 | 0.9 |
| Porosity (%) | 11.1 | 12.3 | 41.2 | 12.7 |
| AT crystal average particle size (μm) | 11 | 5 | 8 | 17 |
| AT crystal amount (%) | 94 | 92 | 59 | 86 |
| Glass phase amount (%) | 6 | 8 | 7 | 9 |
| Amount of rare earth element oxide in glass phase (%) | 15.9 | 12.1 | 13.8 | 11.1 |
| Coefficient of thermal expansion ($\times 10^{-6}$/°C.) | −1.5 | −1.4 | 2.5 | −1.3 |
| Heat conductivity ($\times 10^{-3}$ cal/cm · s · °C.) | 1.1 | — | — | 1.0 |
| Crystal phase other than AT | — | — | rutile corundum | rutile |
| Occurrence of cracks | not cracked | cracked | cracked | not cracked |
| Reduction rate in four point bending strength in cooling-heating cycle (%) | −1 | — | — | 1 |
| Remarks | Example | Comparative | Example | Example |

Note:
AT means aluminum titanate
*means that an unreacted portion exists in AT crystals.

From results in Table 3, it is recognized that the ceramic materials according to the present invention are free from occurrence of cracks on insert-casting, and that they suffer fewer deterioration in the cooling-heating cycle test as compared with Comparative Examples.

As is clear from the foregoing explanation, according to the ceramic materials for use in insert-casting in the present invention and the production process thereof, by using coarse $Al_2O_3$ material having a low purity, fine $TiO_2$ source material and a rare earth element, it is possible to obtained the crystalline structure in which not less than 65% by volume of aluminum titanate is contained as the crystal phase, the average particle size of the crystals is not less than 10 μm, and 20% by volume of the glass phase containing the rare earth element in an amount of 0.5 to 16% by weight when calculated as an oxide is contained. As a result, the ceramic materials for use in insert-casting can be obtained, which have low Young's modulus, excellent heat resistance, thermal shock resistance and heat insulation and durability in the cooling-heating cycles, and are free from occurrence of cracks due to compression forces generated on the insert-casting.

Next, the second aspect of the present invention will be explained below in detail.

First, reasons for numerical limitations will be explained.

The reasons why the rate of aluminum titanate in the crystalline phase is limited to not less than 65% by volume and the average particle diameter is limited to not less than 10 μm are that if these requirements are not met, the actual rupture strain becomes less than $6 \times 10^{-3}$ so that cracks occur on insert-casting. The reason why the actual rupture strain is limited to not less than $6 \times 10^{-3}$ is that ceramic materials having the actual rupture strain of less than this value are likely to be cracked as shown in the below-mentioned experiment. Particularly, it is preferable to set the actual rupture strain to not less than $10 \times 10^{-3}$. Further, since the ceramic material contacts a molten metal at high temperature on insert-casting, it is preferable that the actual rupture strain is not less than $6 \times 10^{-3}$ at high temperatures.

The third aspect of the present invention is to improve durability in the cooling-heating cycles by incorporating a rare earth element in the ceramic material. In this case, the glass phase is limited to 17% by volume, since if the content of the glass phase is more than 17% by volume, the actual rupture strain is less than $6 \times 10^{-3}$. Further, if the content of the rare earth element in the glass phase is less than 0.5% by weight when calculated in the form of the oxide, the reduction rate of the four point bending strength in the cooling-heating cycles exceeds 10%. To the contrary, if the content of the rare earth element is more than 16% by weight, the actual rupture strain becomes less than $6 \times 10^{-3}$. Thus, the oxide of the rare earth element in the glass phase is limited to the range from 0.5 to 16% by weight.

In the ceramic materials according to the second and third aspects of the present invention, sufficient heat-insulating effect cannot be obtained if the porosity is less than 5%. To the contrary, if the porosity is more than 35%, the actual rupture strain may fall outside the range of the present invention. Further, it is preferable that the ceramic material has a composition consisting essentially of 40 to 65% by weight of $Al_2O_3$ and 30 to 60% by weight of $TiO_2$. The reason for this is that if the composition does not meet this requirement, the amount of the crystals of aluminum titanate is difficult to exceed 65% by volume. The reason why at least one kind of $SiO_2$, $MgO$, and $Fe_2O_3$ is contained in a total amount of not more than 10% by weight is that if the total amount is more than 10% by weight, it is difficult to attain the crystal amount of aluminum titanate of not less than 65% by volume, and the crystal diameter may be not more than 10 μm in some cases. The ceramic material according to the present invention has the coefficient of thermal expansion of not more than $2.0 \times 10^{-6}$ (40° to 80° C.), and is suitable for port liners, etc. to be brought into direct contact with exhaust gases at high temperatures.

Next, reasons for the numerical limitations for the second and third aspects of the present invention are as follows:

If the purity of the $Al_2O_3$ source material is greater than 96% by weight and if the average particle size is more than 3 μm, much unreacted portion remains due to low reactivity of the $Al_2O_3$ source material, so that the actual rupture strain becomes less than $6 \times 10^{-3}$, and it is feared that the ceramic material cracks on insert-casting. Further, if the average particle diameter of the $Al_2O_3$ source material is less than 3 μm, the average particle diameter of aluminum titanate becomes less than 10 μm irrespective of the purity so that the actual rupture strain becomes less than $6 \times 10^{-3}$. Furthermore, if impurities contained in the $Al_2O_3$ source material are more than 20% by weight of $SiO_2$, more than 20% by weight of $Fe_2O_3$, or 20% by weight of $SiO_2 + Fe_2O_3$ in total, it may be that the content of the crystals of aluminum titanate is less than 65%, and that the average crystal particle diameter is less than 10 μm. From the above reasons, it is necessary that the $Al_2O_3$ source material has the purity of not more than 96%, and the average particle diameter of not less than 3 μm. The impurities are preferably 0 to 20% by weight of $SiO_2$, 0 to 20% by weight of $Fe_2O_3$, or 0 to 20% by weight of $SiO_2 + Fe_2O_3$ in total.

Further, when the average particle diameter of the $TiO_2$ source material is greater than 3 μm, the amount of the unreacted portion increases. Thus, the actual rupture strain becomes less than $6 \times 10^{-3}$. Consequently, there is a possibility that the ceramic material is cracked on insert-casting. Therefore, the average particle diameter of the $TiO_2$ source material must be not more than 3 μm.

In the production process for producing the ceramic material according to the third aspect of the present invention, the actual rupture strain of the ceramic material is increased by rapidly cooling it under the conditions that the maximum cooling rate is set at 500° C./hr in a temperature range from not less than 200° C. to 40° C. on the midway of the firing and/or after the firing. At that time, if the starting temperature is less than 200° C. or if the maximum cooling rate in the rapidly cooling treatment is less than 500° C./hr, the actual rupture strain cannot fully be increased. It is preferable that the starting temperature in the rapidly cooling treatment is set in a range from 350° to 1,100° C. and that the maximum cooling rate from the starting temperature of the rapidly cooling treatment is set to 2,000° C./hr. By so doing, the actual rupture strain can be increased to not less than $10 \times 10^{-3}$. If the starting temperature of the rapidly cooling treatment is more than 1,100° C., the increased rate of the actual rupture strain decreases. Consequently, aluminum titanate is decomposed, and there is a possibility that the ceramic material is broken on rapid cooling when the material is a product of a large size and complicated shape.

The reason why the addition amount of the rare earth element is limited to not more than 1.8% by weight in the production process for producing the ceramic material according to the third aspect of the present invention when calculated in the form of the oxide is to increase the actual rupture strain to not less than $6 \times 10^{-3}$.

In order to produce the ceramic materials according to the present invention, materials are selected from alumina, calcined bauxite, purified rutile, crude rutile, anatase type titanium, ilmenite, ferrite red iron oxide, electrofused magnesium, magnesite, electrofused, spinel, kaoline, quarts, electrofused silica, specific rare earth elements and the like to give a chemical composition consisting essentially of 40 to 65% by weight of $Al_2O_3$, 30 to 60% by weight of $TiO_2$, and not more than 10% by weight of at least one kind of $SiO_2$, MgO and $Fe_2O_3$ in total. At that time, it is necessary that a starting material containing not more than 96% purity by weight of $Al_2O_3$ and the average particle diameter of not less than 3 μm as the $Al_2O_3$ source material is mixed with a material having the average particle diameter of not more than 3 μm as the $TiO_2$ source material. The rare earth element, which is added to improve durability in cooling-heating cycles, may be added in the form of a nitrate, an oxide or any other compound. In order to obtain an intended effect with a very small addition amount of the rare earth element, it is preferable to uniformly disperse a fine particles of the material. As the rare earth element, Y, La, Ce, Dy and Nd are economically preferred. La, Dy, and Nd have the same effect as that of Y.

0.1 to 1.0% by weight of a deflocculant selected from water glass, ammonium polycarboxylates, amines, sodium pyrophosphate and the like is added to the mixture, to which 1.0 to 5.0% of a binder selected from PVA, MC, CMC, acrylates and the like is added. The resulting mixture is sufficiently mixed and stirred by means of a trommel, a pot mill or the like together with 15 to 40% by weight of water to prepare a slurry having a viscosity of 200 to 1,000 cp. The slurry is shaped in a cylindrical form or in the form of a port liner by casting, which is dried and fired. As a result, the aluminum titanate sintered body can be obtained, which has excellent heat resistance, thermal shock resistance, heat insulation and durability in cooling-heating cycle and which contains not less than 65% by weight of aluminum titanate as the crystalline phase, and further not more than 17% by weight of a glass phase involving 0.5 to 16% by weight of the rare earth element, if added, when calculated in the form of the oxide. One or more kinds of rutile, corundum and mullite may be contained as other crystals.

According to the present invention, the crystals of aluminum titanate are sufficiently grown to the average particle diameter of not less than 10 μm contrary to the conventional common knowledge by setting the firing conditions to 1,450° to 1,650° C., preferably 1,500° to 1,600° C., for 1 to 16 hours. Further, when the ceramic material is to be cooled from not less than 200° C., preferably from not less than 350° C., to 40° C. during firing and/or after the firing, the material is rapidly cooled at the maximum cooling rate of not less than 500° C./hr, preferably not less than 2,000° C./hr. The rapidly cooling is effected in the furnace by leaving the material in the furnace, blowing it with air, or throwing it into water. The above treatment may be effected by two or more times. By so doing, the material having the actual rupture strain of not less than $6 \times 10^{-3}$ can be obtained. The reason why the actual rupture strain can be improved by the above-mentioned rapidly cooling is not completely solved at present. However, it is considered that the amount of very fine microcracks is increased in the aluminum titanate sintered body in such a range as to not almost lower strength.

The ceramic material having such a high actual rupture strain can be shrinked when the insert-cast metallic material contracts, and produces no cracks even when the material is shaped in such a complicated form as to break a conventional ceramic material having high strength and low actual rupture strain due to concentration of stress. Therefore, the ceramic materials according to the present invention are suitable for cylindrical port liners as well as a port liner 3 having a complicated shape in which two ports 2 and a single exhaust port 1 are provided on a cylinder side and on an exhaust manifold side of a four valve engine as shown in FIGS. 1 and 2, respectively, and an exhaust manifold liner 4 shown in FIG. 3. Microcracks in the sintered body lower heat conductivity, so that even a relatively small porosity can afford sufficient heat insulation.

Since aluminum titanate has a melting point of not less than 1,700° C., no limitation is posed upon a molten metal for insert-casting. Gray cast iron, nodular graphite cast iron, white cast iron, aluminum alloy, copper alloy, magnesium alloy, and zinc alloy may be employed for insert-casting.

By incorporating a very small amount of the rare earth element in the glass phase, the intergranular glass phase is firmly bonded to aluminum titanate so that the ceramic material having durability in cooling-heating cycle can be obtained without deteriorating high actual rupture strain as a favorable property for the insert casting.

Next, examples of the second and third aspects of the present invention will be explained below.

Figure 8A:
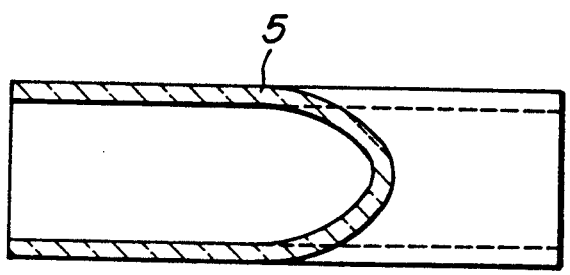
FIGS. 8a and 8b are a vertical cross-sectional view and a horizontal sectional view of a test piece used in an insert-casting test, respectively.
Figure 8B:
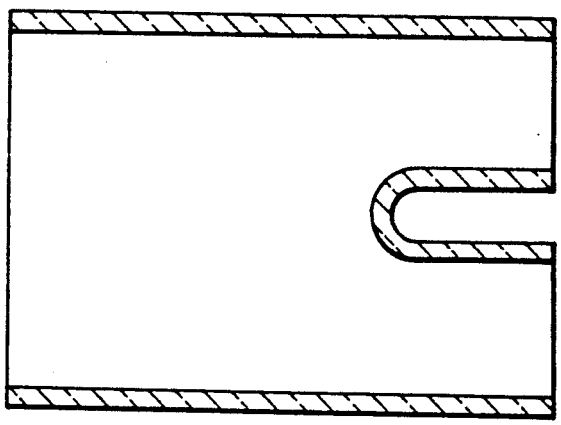

By using an $Al_2O_3$ source material shown in the above Table 1 and a $TiO_2$ source material shown in the above Table 2 as main ingredients, starting materials were formulated to give compositions in Test Run Nos. 33 to 45 in Table 4 and Test Run Nos. 46 to 60 shown in Table 5. Each of the materials was cast into a mold to form a test piece 5 having a bifurcated elliptical section shape of 4 mm thickness shown in FIG. 8. Each test piece was fired under conditions given in Tables 4 and 5, and various physical properties were measured with respect to the thus obtained fired bodies.

Next, after molding sand was charged into each of the sintered bodies, it was enclosed with aluminum by casting, thereby producing a metal-ceramic composite body having 7 mm thick aluminum. After the molding sand was removed, it was visually confirmed whether cracks occurred in the test piece or not. Results are shown in Tables 4 and 5.

In the cooling-heating cycle test of Table 5, the test piece was subjected to cooling-heating cycles shown in FIG. 4 in which the test piece was kept at room temperature for 10 minutes and at 900° C. for 20 minutes by 50 times. Then, a reduction rate in the four point bending strength between before and after the test was measured. The amounts of aluminum titanate and the glass phase were calculated as % by volume by their area-occupying ratios in an SEM photograph. The content of the rare earth element in the glass phase was measured by an EDX analysis in a transmission electron microphotograph. In order to confirm changes in the rapid cooling treatment with respect to the materials according to the present invention and as comparative examples, FIGS. 10a and 10b show electron microphotographs of a sintered body and that having undergone the rapid cooling treatment, respectively. It is seen from FIGS. 10a and 10b that no great changes occurred in the crystalline structure by the rapid cooling treatment, and that strength was not changed by the rapid cooling. Further, FIG. 9a shows changes in the actual rupture strain when the cooling-starting temperature in the rapid cooling treatment was varied, and FIG. 9b shows changes in the actual rupture strain when the cooling rate in the rapidly cooling treatment was varied.

TABLE 4(a)

| Run No. | | 33 | 34 | 35 | 36 | 37 | 38 | 39 |
|---|---|---|---|---|---|---|---|---|
| $Al_2O_3$ source material | | A-3 | A-3 | A-3 | A-3 | A-3 | A-2 | A-4 |
| $TiO_2$ source material | | T-3 | T-3 | T-3 | T-3 | T-3 | T-3 | T-3 |
| Composition (wt %) | $Al_2O_3$ | 44.0 | 53.8 | 53.8 | 54.2 | 62.9 | 54.3 | 54.3 |
| | $TiO_2$ | 52.0 | 42.2 | 42.2 | 42.5 | 33.8 | 42.5 | 42.5 |
| | $SiO_2$ | 3.0 | 3.0 | 3.0 | 1.1 | 3.3 | 1.6 | 1.6 |
| | MgO | — | — | — | 1.1 | — | — | — |
| | $Fe_2O_3$ | 1.0 | 1.0 | 1.0 | 1.1 | — | 1.6 | 1.6 |
| Firing temperature (°C.) | | 1600 | 1550 | 1600 | 1550 | 1550 | 1500 | 1500 |
| Rapidly cooling condition | Starting temperature (°C.) | 600 | 200 | 350 | 350 | 350 | 400 | 400 |
| | Cooling rate (°C./HR) | 10000 | 500 | 2000 | 2000 | 2000 | 1000 | 1000 |
| Actual rupture strain ($\times 10^{-3}$) | | 17 | 8 | 18 | 17 | 12 | 9 | 9 |
| Porosity (%) | | 5.2 | 7.0 | 7.2 | 9.1 | 11.5 | 11.8 | 10.9 |
| AT crystal average particle size (μm) | | 20 | 11 | 24 | 18 | 13 | 18 | 10 |
| AT crystal amount (%) | | 73 | 92 | 90 | 93 | 77 | 86 | 96 |
| Coefficient of thermal expansion ($\times 10^{-6}$/°C.) | | −1.1 | −1.5 | −1.6 | −1.8 | 0.8 | −1.0 | −1.3 |
| Occurrence of cracks | | not cracked | not cracked | not cracked | not cracked | not cracked | not cracked | not cracked |
| Remarks | | | | | Example | | | |

TABLE 4(b)

| Run No. | | 40 | 41 | 42 | 43 | 44 | 45 |
|---|---|---|---|---|---|---|---|
| $Al_2O_3$ source material | | A-3 | A-3 | A-3 | A-1 | A-5 | A-3 |
| $TiO_2$ source material | | T-2 | T-2 | T-3 | T-3 | T-3 | T-1 |
| Composition (wt %) | $Al_2O_3$ | 54.3 | 53.8 | 62.9 | 54.3 | 54.3 | 54.3 |
| | $TiO_2$ | 42.5 | 42.2 | 33.8 | 42.5 | 42.5 | 42.5 |
| | $SiO_2$ | 1.6 | 3.0 | 3.3 | 1.6 | 1.6 | 1.6 |
| | MgO | — | — | — | — | — | — |
| | $Fe_2O_3$ | 1.6 | 1.0 | — | 1.6 | 1.6 | 1.6 |
| Firing temperature (°C.) | | 1500 | 1600 | 1550 | 1500 | 1500 | 1500 |
| Rapidly cooling condition | Starting temperature (°C.) | 400 | 400 | 600 | 400 | 400 | 400 |
| | Cooling rate (°C./HR) | 1000 | 500 | 100 | 1000 | 1000 | 1000 |
| Actual rupture strain ($\times 10^{-3}$) | | 9 | 6 | 4 | 2 | 1 | 2 |
| Porosity (%) | | 12.6 | 7.5 | 10.7 | 34.5 | 12.5 | 41.0 |
| AT crystal average particle size (μm) | | 17 | 21 | 12 | 14 | 6 | 9 |
| AT crystal amount (%) | | 88 | 89 | 81 | 64 | 90 | 55 |
| Coefficient of thermal expansion ($\times 10^{-6}$/°C.) | | −1.1 | −1.4 | 1.2 | 2.0 | −1.4 | 2.1 |
| Occurrence of cracks | | not cracked | not cracked | cracked | cracked | cracked | cracked |
| Remarks | | Example | | | Comparative Example | | |

TABLE 5(a)

| Run No. | | 46 | 47 | 48 | 49 | 50 |
|---|---|---|---|---|---|---|
| $Al_2O_3$ source material | | A-3 | A-3 | A-3 | A-3 | A-3 |
| $TiO_2$ source material | | T-3 | T-3 | T-3 | T-3 | T-3 |
| Composition (wt %) | $Al_2O_3$ | 44.0 | 53.8 | 53.8 | 51.6 | 53.8 |
| | $TiO_2$ | 52.0 | 42.2 | 42.2 | 40.4 | 42.2 |
| | $SiO_2$ | 3.0 | 3.0 | 3.0 | 8.0 | 3.0 |
| | MgO | — | — | — | — | — |
| | $Fe_2O_3$ | 1.0 | 1.0 | 1.0 | 1.0 | 1.0 |
| | Oxide of rare earth element | 0.25 ($CeO_2$) | 1.5 ($CeO_2$) | 0.25 ($CeO_2$) | 1.8 ($Y_2O_3$) | 0.05 ($CeO_2$) |
| Firing temperature (°C.) | | 1600 | 1550 | 1600 | 1550 | 1550 |
| Rapidly cooling condition | Starting temperature (°C.) | 600 | 200 | 350 | 200 | 900 |
| | Cooling rate (°C./HR) | 10000 | 500 | 2000 | 500 | 10000 |
| Actual rupture strain ($\times 10^{-3}$) | | 14 | 6 | 15 | 6 | 16 |
| Porosity (%) | | 5.5 | 7.3 | 7.4 | 5.4 | 8.7 |
| AT crystal average particle size (μm) | | 19 | 12 | 23 | 20 | 20 |
| AT crystal amount (%) | | 75 | 91 | 92 | 83 | 92 |
| Glass phase amount (%) | | 8 | 9 | 8 | 17 | 8 |
| Amount of rare earth element oxide in glass phase (%) | | 2.8 | 16.0 | 2.5 | 11.5 | 0.5 |
| Coefficient of thermal expansion ($\times 10^{-6}$/°C.) | | −1.4 | −1.7 | −1.9 | 1.8 | −1.7 |

TABLE 5(a)-continued

| Run No. | 46 | 47 | 48 | 49 | 50 |
|---|---|---|---|---|---|
| Occurrence of cracks | not cracked | not cracked | not cracked | not cracked | not cracked |
| Reduction rate in four point bending strength in cooling-heating cycles (%) | 1 | −2 | 2 | −1 | 5 |
| Remarks | | | Example | | |

TABLE 5(b)

| | Run No. | 51 | 52 | 53 | 54 | 55 |
|---|---|---|---|---|---|---|
| $Al_2O_3$ source material | | A-3 | A-3 | A-2 | A-3 | A-4 |
| $TiO_2$ source material | | T-3 | T-3 | T-3 | T-3 | T-3 |
| Composition (wt %) | $Al_2O_3$ | 54.2 | 62.9 | 54.3 | 54.3 | 54.3 |
| | $TiO_2$ | 42.5 | 33.8 | 42.5 | 42.5 | 42.5 |
| | $SiO_2$ | 1.1 | 3.3 | 1.6 | 1.6 | 1.6 |
| | MgO | 1.1 | — | — | — | — |
| | $Fe_2O_3$ | 1.1 | — | 1.6 | 1.6 | 1.6 |
| | Oxide of rare earth element | 0.5/0.5 ($Y_2O_3/CeO_2$) | 1.25 ($Y_2O_3$) | 1.0 ($CeO_2$) | 1.0 ($CeO_2$) | 1.0 ($CeO_2$) |
| Firing temperature (°C.) | | 1550 | 1550 | 1500 | 1500 | 1500 |
| Rapidly cooling condition | Starting temperature (°C.) | 350 | 350 | 400 | 400 | 400 |
| | Cooling rate (°C./HR) | 2000 | 2000 | 1000 | 1000 | 1000 |
| Actual rupture strain ($\times 10^{-3}$) | | 13 | 10 | 8 | 9 | 7 |
| Porosity (%) | | 9.4 | 11.3 | 11.9 | 9.6 | 11.2 |
| AT crystal average particle size (μm) | | 18 | 12 | 18 | 19 | 10 |
| AT crystal amount (%) | | 93 | 79 | 88 | 91 | 94 |
| Glass phase amount (%) | | 7 | 10 | 9 | 9 | 6 |
| Amount of rare earth element oxide in glass phase (%) | | 13.9 | 12.2 | 10.7 | 10.5 | 16.0 |
| Coefficient of thermal expansion ($\times 10^{-6}$/°C.) | | −2.0 | 0.5 | −1.5 | −1.7 | −1.6 |
| Occurrence of cracks | | not cracked | not cracked | not cracked | not cracked | not cracked |
| Reduction rate in four point bending strength in cooling-heating cycles (%) | | 1 | −2 | 2 | 1 | −1 |
| Remarks | | | | Example | | |

TABLE 5(c)

| | Run No. | 56 | 57 | 58 | 59 | 60 |
|---|---|---|---|---|---|---|
| $Al_2O_3$ source material | | A-3 | A-3 | A-1 | A-5 | A-3 |
| $TiO_2$ source material | | T-2 | T-3 | T-3 | T-3 | T-1 |
| Composition (wt %) | $Al_2O_3$ | 54.3 | 69.2 | 54.3 | 54.3 | 54.3 |
| | $TiO_2$ | 42.5 | 33.8 | 42.5 | 42.5 | 42.5 |
| | $SiO_2$ | 1.6 | 3.3 | 1.6 | 1.6 | 1.6 |
| | MgO | 1.1 | — | — | — | — |
| | $Fe_2O_3$ | 1.6 | — | 1.6 | 1.6 | 1.6 |
| | Oxide of rare earth element | 1.0 ($CeO_2$) | 1.25 ($Y_2O_3$) | 1.0 ($CeO_2$) | 1.0 ($CeO_2$) | 1.0 ($CeO_2$) |
| Firing temperature (°C.) | | 1500 | 1550 | 1500 | 1500 | 1500 |
| Rapidly cooling condition | Starting temperature (°C.) | 400 | 600 | 400 | 400 | 400 |
| | Cooling rate (°C./HR) | 1000 | 100 | 1000 | 1000 | 1000 |
| Actual rupture strain ($\times 10^{-3}$) | | 8 | 4 | 2 | 1 | 2 |
| Porosity (%) | | 12.9 | 11.1 | 35.0 | 12.3 | 41.3 |
| AT crystal average particle size (μm) | | 17 | 12 | 13 | 5 | 8 |
| AT crystal amount (%) | | 86 | 79 | 60 | 92 | 59 |
| Glass phase amount (%) | | 9 | 10 | 7 | 8 | 7 |
| Amount of rare earth element oxide in glass phase (%) | | 11.1 | 12.1 | 14.1 | 12.1 | 13.8 |
| Coefficient of thermal expansion ($\times 10^{-6}$/°C.) | | −1.5 | 0.9 | 2.0 | −1.5 | 2.2 |
| Occurrence of cracks | | not cracked | cracked | cracked | cracked | cracked |
| Reduction rate in four point bending strength in cooling-heating cycles (%) | | 1 | −2 | 0 | 0 | 0 |

TABLE 5(c)-continued

| Run No. | 56 | 57 | 58 | 59 | 60 |
|---------|----|----|----|----|----|
| Remarks | Example | | Comparative Example | | |

From the above, it is clear that according to the ceramic materials for use in insert-casting and the production process therefor, the novel ceramic materials having the actual rupture strain of not less than $6 \times 10^{-3}$ can be obtained. The ceramic materials according to the present invention have excellent heat resistance, thermal shock resistance, and heat insulation, and are practically excellent products free from occurrence of cracks due to compression forces developed on insert-casting. Thus, the materials are suitable as materials for various liners in exhaust systems including port liners to be brought into high temperature exhaust gases. Therefore, the present invention greatly contributes to industrial development as providing the ceramic materials suitable for insert-casting and the production process therefor, which solve the conventional problems.

We claim:

1. A sintered ceramic material for use in insert casting, comprising:
   at least 65% by volume aluminum titanate as a crystalline phase, the diameter of crystals of aluminum titanate being at least 10 μm; and
   a glass intergranular phase present in an amount of not more than 20% by volume, said glass phase comprising a rare earth element in an amount of 0.5-16% by weight when calculated in the form of an oxide;
   wherein said sintered ceramic material has a porosity of 5-35%, a four-point bending strength of 0.2-1.7 kgf/mm$^2$, a Young's modulus of 50-2,000 kgf/mm$^2$ and a reduction rate in cooling-heating cycling of not more than 9%.

2. The sintered ceramic material according to claim 1, wherein said material has a compression strength of 5 to 40 kgf/mm$^2$.

3. The sintered ceramic material according to claim 1, further comprising a composition consisting essentially of 40 to 65% by weight of Al$_2$O$_3$ and 30 to 65% by weight of TiO$_2$ as main ingredients.

4. The sintered ceramic material according to claim 3, further comprising not more than 10% by weight in total of at least one material selected from the group consisting of SiO$_2$, MgO and Fe$_2$O$_3$.

5. The sintered ceramic material according to claim 1, wherein the amount of the rare earth element is not more than 1.8% by weight.

6. The sintered ceramic material according to claim 1, wherein said aluminum titanate is present in an amount of at least about 80% by volume.

7. The sintered ceramic material according to claim 1, wherein said aluminum titanate is present in an amount of at least about 90% by volume.

8. The sintered ceramic material according to claim 1, wherein said sintered ceramic material has a porosity of about 5-14%.

9. A sintered ceramic material for use in insert casting, comprising:
   at least 65% by volume aluminum titanate as a crystalline phase, the diameter of crystals of aluminum titanate being at least 10μm; and
   a glass intergranular phase present in an amount of not more than 20% by volume, said glass phase comprising a rare earth element in an amount of 0.5-16% by weight when calculated in the form of an oxide;
   wherein said sintered ceramic material has a porosity of 5-35%, a four point bending strength of 0.2-1.7 kgf/mm$^2$, an actual rupture strain of not less than $6 \times 10^{-3}$ and a reduction rate in cooling-heating cycling of not more than 9%.

10. The sintered ceramic material according to claim 9, wherein said aluminum titanate is present in an amount of at least about 80% by volume.

11. The sintered ceramic material according to claim 9, wherein said aluminum titanate is present in an amount of at least about 90% by volume.

12. The sintered ceramic material according to claim 9, wherein said sintered ceramic material has a porosity of about 5-14%.

13. The sintered ceramic material according to claim 9, further comprising not more than 17% by volume of a glass containing a rare earth element in an amount of 0.5 to 16% by weight when calculated in the form of an oxide.

14. The sintered ceramic material according to claim 9, further comprising a composition consisting essentially of 40 to 65% by weight of Al$_2$O$_3$ and 30 to 60% by weight of TiO$_2$ as main ingredients.

15. The sintered ceramic material according to claim 9, further comprising not more than 10% by weight total of at least one material selected from the group consisting of SiO$_2$, MgO, and Fe$_2$O$_3$.

* * * * *